Jan. 25, 1966 B. W. BADENOCH ETAL 3,230,894
POWER TRANSMISSION

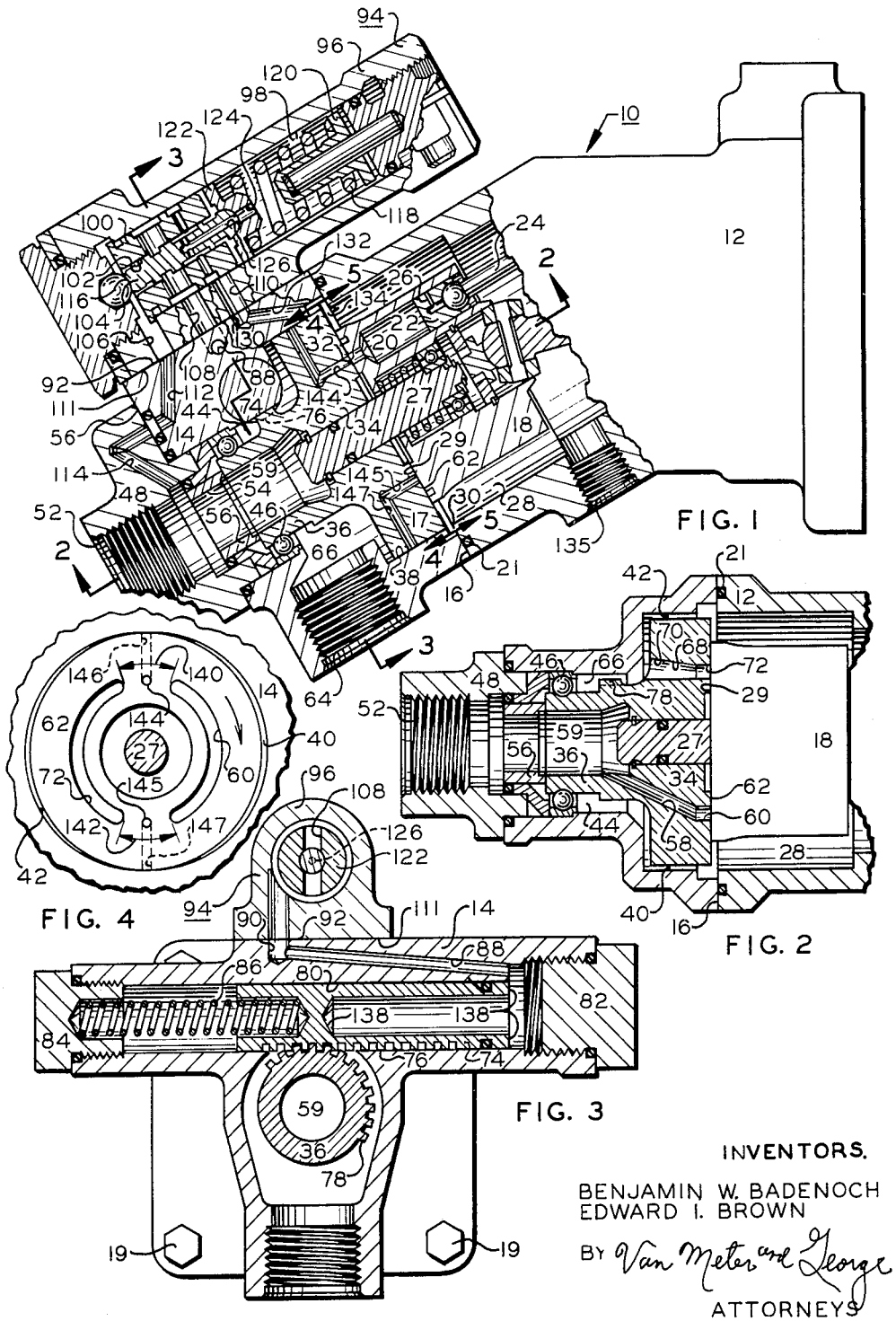

Filed Nov. 5, 1962 2 Sheets-Sheet 2

INVENTORS
BENJAMIN W. BADENOCH
EDWARD I. BROWN
BY Van Meter and George
ATTORNEYS United States Patent Office 3,230,894
Patented Jan. 25, 1966

3,230,894
POWER TRANSMISSION
Benjamin W. Badenoch, Orchard Lake, and Edward I. Brown, Bloomfield Township, Oakland County, Mich.
Filed Nov. 5, 1962, Ser. No. 235,337
5 Claims. (Cl. 103—162)

This application relates to the power transmission device disclosed in application Serial No. 786,735, filed January 14, 1959, now U.S. Patent No. 3,108,542, in the names of Benjamin W. Badenoch, Edward I. Brown, Joseph S. Cardillo, and Clarence E. Liles.

This invention relates to power transmissions and is particularly applicable to those of the type comprising two or more fluid pressure energy translating devices, one of which may function as a pump and another as a fluid motor.

The invention is generally concerned with fluid pumps or motors of the rotary axial piston type and, in particular, with an improved variable displacement device of this type. For the purposes of convenience the invention will be described as a fluid pump, but it should be understood that the term pump when used hereafter in the specification and claims embraces both a fluid pump and a fluid motor.

Such devices comprise a casing within which is a rotary cylinder barrel having a plurality of parallel cylinder bores within which pistons reciprocate, the pistons extending from the cylinder barrel to either directly abut camming means, such as a thrust plate member, or being associated therewith by means of articulated connecting rods. The cylinder barrel rotates against a valve plate having inlet and outlet ports, which serves in a well-known manner to provide properly phased communication between the end ports of the cylinder bores within which the pistons reciprocate and inlet and outlet passages of the device. Examples of the type of devices described are disclosed in the patents to J. Martin, No. 2,404,309; to R. Janney, No. 1,020,285; and to A. Keel, No. 2,776,628.

In such devices the axis of the thrust plate member is inclined relative to the axis of rotation of the cylinder barrel for reciprocating the pistons, the total displacement of the device being resolved by the relative angle of inclination between the axes of the two members, since the displacement of each piston is determined by the area of the cylinder bore and the length of stroke of the piston, and the length of stroke of the piston is determined by the relative angle of inclination of the axis of rotation of the cylinder barrel and the axis of the thrust plate member.

It has been the practice, therefore, to vary the displacement of such devices by providing a swinging yoke for changing the angle of tilt of the cylinder barrel to vary piston stroke length or by providing mechanism for changing the angle of tilt of the thrust plate member to vary piston stroke length, which yoke or other mechanism may be manually or fluid pressure operated. Examples of two such forms of variable displacement devices are disclosed in Patents, No. 2,565,208 to J. Dietiker and No. 2,708,879 to T. Van Meter.

Rotary axial piston devices of the type described have been on the market for years and have been proven to be successful, being more adaptable and efficient than other forms of fluid energy translating devices, such as sliding vane and gear type devices, for extremely high speed and high pressure applications, for example, the driving of aircraft accessories. It should be noted, however, that variable displacement, rotary axial piston devices of the type described are considerably greater in size and weight than corresponding units of the fixed displacement type and, of course, are appreciably greater in cost. Although the fixed displacement versions of the two types of devices for the same maximum displacement may be relatively compact and uncomplicated, the variable displacement units are substantially larger and more complex in structure than the fixed displacement units because of the variable displacement actuating mechanism and elements associated theerwith such as pintles for the swinging yoke. Another factor contributing to their increased size is that the casing must be made large enough to provide space for freedom of swinging movement of the yoke and cylinder barrel or of the tiltable thrust plate member and its associated actuating mechanism.

Thus, savings in manufacturing costs and consequent reduction in the sales price, which could be accomplished by making both the casings and the rotary pump and motor assemblies mounted within such casings basically the same for both fixed and variable displacement types of units, are not achieved because of the necessity of providing casings of a different size and of entirely different construction for the fixed and variable displacement units.

Still other forms of variable displacement, reciprocating piston, fluid energy translating devices have been devised wherein the displacement is varied by means other than changing the length of stroke of the pistons, such as through the medium of bypassing a variable portion of the displacement of each discharging piston back to the inlet side of the device or by changing the phase relation between the reciprocating pistons and coacting valve porting. An example of the difference in construction between a fixed and a variable displacement rotary axial piston pump of this type may be found in Patents, No. 2,381,056 and No. 2,433,222 to M. W. Huber. An example of a radial piston device wherein the phase relation between reciprocating pistons and coacting valve porting is altered to vary the displacement of the device, through the medium of rotating the piston track, is shown in the patent to R. Tweedale, No. 2,237,018.

In addition to the difference in construction of the casings and pumping assemblies in fixed and variable displacement devices of the type, wherein the phase relation between piston stroking and coacting porting is altered, resulting in the disadvantage of substantially increased size and weight of the variable displacement units over that of fixed displaced units, there is also present the problem of cavitation and high pressure impulses. When the phase relation between stroking pistons and coacting valve porting is altered to vary the displacement of the device, there is a tendency for pistons on a portion of their suction stroke to be starved, and for pistons on a portion of their discharge stroke to discharge into a path which has been closed by change in valve porting relation, thus creating high pressure impulses. Prior art devices have not overcome this problem by failing to provide on either one or the other, or on both the suction and pressure phases of the device, means for substantially overcoming cavitation and high pressure impulses.

It is, therefore, an object of this invention to provide an improved variable displacement, fluid energy translating device of the rotary axial piston type.

It is another object of this invention to provide an improved variable displacement, rotary axial piston fluid energy translating device of the fixed angle type.

It is still another object of this invention to provide an improved variable displacement, fluid energy translating device of the rotary axial piston type, the casing and the pump or motor assembly of which may be substantially and basically the same as in conventional fixed displacement types of devices.

It is a further object of this invention to provide for rotary axial piston type of devices, a pump head and rotary fluid distributing member assembly mountable at one end of the casing of such device for varying the effective displacement of the pumping mechanism.

It is a further object of this invention to provide for a fluid energy translating device of the type recited in the preceding object, a pump head and fluid distributing member assembly for varying the displacement of the device without changing the length of stroke of the pistons.

It is a further object of this invention to provide for a fluid energy translating device of the type recited, a pump head and a rotatable fluid distributing member within such pump head also having means completely within the pump head for rotating the fluid distributing member to change the phase relationship between valve plate porting of the fluid distributing member and of the reciprocating pistons for varying the effective displacement of the device.

It is still another object of this invention to provide in a device of the type previously recited, a rotary fluid distributing member for varying the phase relation between valve plate porting and reciprocating pistons for varying the effective displacement of the device and wherein a variable bleed path is provided for piston displacement, as the cylinder ports cross over the closed surface areas located between inlet and outlet ports opening to the valve plate.

It is also an object of this invention to provide in a device of the type recited, a variable bleed path from the fluid distributing member, as recited in the previous object, the variation of which is correlated to valve plate rotation and a change in phase relationship between valve plate porting and the reciprocating pistons.

It is a further object of this invention to provide an improved variable displacement fluid energy translating device of the rotary axial piston type, which is smaller in size and weight than previous axial piston variable displacement units, which is economical to manufacture and which is efficient and long lasting.

Further objects and advantages of the present invention will be apparent from the following description, reference being had to the accompanying drawings wherein a preferred form of the present invention is clearly shown.

In the drawings:

FIGURE 1 is a longitudinal sectional view of a fluid pressure energy translating device embodying a preferred form of the present invention.

FIGURE 2 is a partial sectional view taken on line 2—2 of FIGURE 1 further illustrating the pump head and fluid distributing member.

FIGURE 3 is a sectional view taken on line 3—3 of FIGURE 1.

FIGURE 4 is a view of the valve plate face taken on line 4—4 of FIGURE 1.

Figure 5:
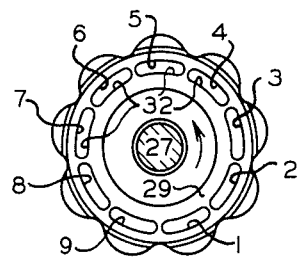
FIGURE 5 is a view of the cylinder barrel face taken on line 5—5 of FIGURE 1.

Referring now to FIGURE 1, there is shown a fluid pump embodying the present invention, indicated generally by the numeral 10, comprising a hollow casing member 12 within which is mounted rotary pumping mechanism of the well-known fixed angle, rotary axial piston type. A pump head member 14 is secured to a plane mounting face 16 of the casing 12 within which is rotatably mounted a fluid distributing member, indicated generally by the numeral 17, for varying the displacement of the pumping mechanism. The pump head is secured to the plane face of the casing selection by means of a plurality of screws 19, shown in FIGURE 3, extending from a rectangular end face of the pump head and threaded into the casing 12. An O-ring 21 is provided for sealing between the opposing casing and pump head faces.

The rotary axial piston pumping mechanism is of the well-known type disclosed in the patent to J. Martin, No. 2,404,309. Pumping mechanism of this type includes a rotary cylinder barrel, indicated by the numeral 18, having a plurality of axial cylinder bores 20 in which pistons 22 are slidable, the pistons having rods 24 connected thereto extending from the cylinder bores which are adapted to be associated with camming means, not shown, such as a thrust plate member, for reciprocating the pistons in the well-known manner. In such devices a drive shaft is provided for the thrust plate member or camming means, the thrust plate member being adapted to carry a plurality of connecting rod sockets for articulating the rods 24 thereto, the rods carrying the pistons 22 which are articulated thereto by means of ball joints. lubricated by means of passages 26.

The cylinder barrel 18 is rotatably journalled on a cylinder bearing pin 27 extending into the hollow portion of the casing 12, indicated by the numeral 28, and has a valving face 29 (FIGURE 4) extending through an axial opening 30 at the mounting face 16 of the casing. Each of the cylinder bores are provided with a cylinder port 32 (FIGURE 5) which open to the valving face 29 of the cylinder barrel. The cylinder bearing pin is supported in a valve plate 34 of the fluid distributing member 17.

The fluid distributing member 17 comprises the cylindrical valve plate 34 which has formed thereon, so as to be integral therewith, an axially extending hollow pintle 36. The pump head is provided with an enlarged chamber 38, the wall of which surrounding the valve plate, as shown more clearly in FIGURE 4, is substantially elliptical in shape and which forms with the cylindrical valve plate diametrically opposed bleed paths 40 and 42 (FIGURES 4 and 5) within the enlarged chamber between the surrounding wall of the chamber and the peripheral surface of the plate, the purpose of which will be later described. The opposed true arc wall portions of the elliptical chamber serve to rotatably support the cylindrical valve plate within the chamber.

A smaller chamber 44, axially coextensive with the enlarged chamber 38, is also provided in the pump head 14 and within which the hollow pintle 36 is rotatably mounted, the pintle being supported therein on bearings 46. An outlet connection port member 48 is secured to the outer end face 50 of pump head 14, which has an axially disposed outlet connection port 52 formed therein registering with the axially coextensive hollow portion 54 of a sleeve spacer member 56, which is maintained in engagement against the opposing faces of the pintle member and the outlet port connection member.

An angular passage 58 (FIGURE 2) leads from the hollow portion of the pintle member, just ahead of the cylinder bearing pin, which extends through the valve plate and terminates in an arcuately shaped valve plate outlet port 60 (FIGURE 4) opening to a plane valving face 62 of the valve plate 34 maintained in fluid sealing engagement with the cylinder barrel valving face 29. The hollow portion of the pintle, indicated by the numeral 59, thus forms an outlet passage axially coextensive with the outlet connection port 52 to which the valve plate outlet port 60 is continuously connected by the angular passage 58.

The pump head 14 is constructed with a radially disposed inlet port 64 which opens to the smaller chamber 44 through which the pintle extends. As the chamber 44 is greater in size than the pintle, an inlet passage is formed in the smaller chamber 44 surrounding the outer periphery of the pintle member, said inlet passage being indicated by the numeral 66. An inlet passage 68 is formed in the valve plate which opens axially at one end, indicated by the numeral 70, to the inlet passage 66 of the pump head and which has an opening at its opposite end forming an arcuately shaped valve plate inlet port 72 at the valve plate valving face 62.

For the purpose of biasing the valve plate 34 to the maximum displacement position shown and for rotating the valve plate to various positions for varying the displacement of the pumping mechanism, there is provided completely within the pump head a fluid pressure operated rack 74 having teeth 76 thereon which mesh with teeth 78 formed on the periphery surface of the hollow pintle 36. The rack 74 is slidably mounted in a longitudinal bore 80 of the pump head 14, the opposite open ends of which are closed by threaded closure members 82 and 84. The rack 74 is maintained in the position shown by a spring 86, the opposite ends of which engage the closure member 84 and the rack 74.

For the purpose of fluid pressure operating the rack member 74 so as to rotate the pintle and thus the valve plate, an angular pressure supply passage 88 is provided in the pump head 14, which is connected to one end of the longitudinal bore 80 and which has connected thereto a radial passage 90 opening to a plane mounting face 92 of the pump head on which a control valve 94 is mounted. The control valve 94 is comprised of a housing 96 having a longitudinal bore 98 within which is mounted a sleeve 100 having a valve bore 102 and within which bore is slidably mounted a control valve spool 104. The housing 96 is provided with three spaced apart radial passages 106, 108 and 110 which open at one end thereof to a plane mounting face 111 of the control valve housing, engaging the mounting face 92 of the pump head and which open at their opposite ends to the longitudinal bore 98. Passage 106 functions as a pressure inlet passage, being connected by a pressure inlet passage 112 in the pump head member and a pressure inlet passage 114 in the outlet connection member to the outlet connection port of the device, and leading to the left end of the sleeve bore 102 in which an effective end area 116 of the valve spool is exposed. Valve spool 104 is biased to the position shown by a spring 118 mounted in the longitudinal bore 98 between spring guide and retainer members 120 and 122, the lattter of which engages one end of the valve spool 104.

Passage 108 functions as a pressure control passage which registers with a similar pressure control passage of the sleeve member 100 so as to form a continuous passage leading to the valve sleeve bore 102 controlled by the valve spool. Passage 110 functions as an exhaust passage which registers with a similar exhaust passage formed in the sleeve so as to form a continuous exhaust passage leading from the mounting face 111 to the valve sleeve bore 102. When the valve spool 104 is shifted rightwardly and the valve spool and retainer member 122 are thus shifted in the longitudinal bore 98, fluid displacement from the spring end of said bore is conducted by means of an axial passage 124 in the retainer 122 and longitudinal and transverse passages 126 and 128 respectively formed in the valve spool 104 to the exhaust passage 110. The exhaust passage 110 is connected to the interior or hollow portion 28 of casing 12 by means of a radial passage 130 opening to the mounting face 92 of the pump head which registers with the opening of the exhaust passage 110, and an angular passage 132 connected to the passage 130 and which leads to a groove 134 formed in the wall of enlarged chamber 38, the groove 134 connecting the elliptically formed portion of said chamber to the interior of the casing. The interior of the casing is in turn connected to the inlet side of the device by means of the groove 134 and the bleed paths 40 and 42 formed between the outer periphery of the valve plate and the elliptical formed portion of the chamber, said bleed paths opening on one side thereof to the inlet passage 66 formed in the small chamber 44 surrounding the pintle 36. The interior of the casing may optionally be drained through a radially disposed bleed port 135 in the casing 12.

When the control valve spool 104 is shifted rightwardly, a land 136, which in the neutral position of the valve spool shown blocks communication between the pressure passage 106 and the control passage 108 of the sleeve member, now permits said communication; and pressure fluid from the outlet side of the device is conducted from the pressure passage 106 and valve sleeve bore 102 to the pressure control passage 108, which opens to the mounting face of the control valve, and thence to the pressure control passage 90 which opens to the mounting face of the pump head 14. The control valve 94 thus serves the purpose of connecting the outlet side of the pump at a maximum pressure determined by the resistance of spring 118 to the rack actuator member 74 and will port pressure fluid at a controlled pressure in the well-known manner to shift the rack member 74 to various positions as determined by the resistance of spring 86.

When outlet pressure decreases below the setting of spring 118 of valve spool 104, the valve spool 104 is shifted leftwardly by the spring 118 back to the neutral position shown. Upon such decrease in pressure, the spring 86 of rack member 74 will return the rack member to the position shown. In the position of valve spool 104 shown, the pressure effective areas of the rack member, indicated by the numeral 138, are connected to the interior of the casing by means of a groove between lands of the control valve spool which connect passage 108 to the exhaust passage 110.

For the purpose of more clearly describing the operation of the device, the cylinder ports 32 of the cylinder barrel valving face 29, as illustrated in FIGURE 4, have been additionally provided with the numerals 1 to 9, which numerals are intended to indicate anyone of the nine pistons of the cylinder barrel as to their stroke position within the cylinder bores relative to the adjacent inlet and outlet ports of the rotary valve plate opening to the valving face 62 thereof, as shown in FIGURE 4, as if the cylinder barrel was stopped in the position shown in FIGURE 5. Rotation of the valve plate in the present device is adapted to be in the same direction as cylinder barrel rotation and will be clockwise, as viewed in FIGURE 4 of the valve plate, cylinder barrel rotation being counterclockwise, as viewed in FIGURE 5. Reference may also be made to the flow displacement diagrams of FIGURES 6, 7 and 8 which illustrate the porting phase relationship of the valve plate and stroking pistons at different positions of the valve plate.

Figure 6:
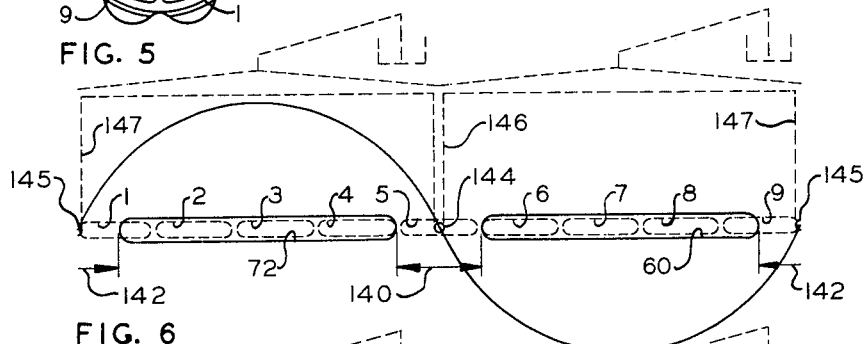
FIGURE 6 is a displacement diagram illustrating the phase relationship of valve plate porting and cylinder barrel piston stroking with the valve plate at maximum displacement position.

Each piston 22 of the cylinder barrel 18 will be initiating a suction stroke when its associated cylinder port 32 is in a position indicated by the numeral 1 in FIGURE 6 and will be completing a suction stroke when in the position of the cylinder port indicated by the numeral 4. Also each piston will be initiating a discharge stroke when the cylinder port is in the position indicated by the numeral 6 and will be completing a discharge stroke when in the position of the cylinder port indicated by the numeral 9.

Thus in the maximum displacement position of the valve plate 34 shown, the pistons within the cylinder barrel bores having associated cylinder ports 32, which are located in the positions indicated by the numerals from 1 to 4, will be on their suction stroke; and during the entire suction stroke each of said pistons will be in communication with the valve plate inlet port 72 through each of their associated cylinder ports 32. The pistons associated with the cylinder ports in the positions indicated by the numerals from 6 to 9 will be on their discharge stroke and during their entire discharge stroke will be in communication with the valve plate outlet port 60 through each of their associated cylinder ports 32. The piston at the position indicated by the numeral 5 will be at bottom center of its stroke, which in the maximum displacement position of the valve plate will be located between the outlet and inlet ports on a changeover from a suction stroke to a discharge stroke. The solid surface or gap of the valve plate face between the spaced apart inlet and outlet ports across which piston 5 is passing is indicated in FIGURE 4 by the numeral 140. If the cylinder barrel 18 is rotated slightly clockwise from the position shown in FIGURE 5, the piston indicated by the numeral 9 will, in the maximum displacement position of the rotary valve plate, be at the top center of its stroke and at the changeover position from its pressure to its suction stroke crossing over another solid gap located between the valve plate inlet and outlet port. The solid surface gap between the inlet and outlet ports across which piston 9 would pass is indicated in FIGURE 4 by the numeral 142. Bleed passages are provided in the valve plate which are opened to the bleed paths when the valve plate is rotated, which will be later described.

For the purpose of more clearly illustrating the phase relationship between the valve plate inlet and outlet ports 60 and 72 and the stroking pistons associated with the cylinder ports 32 which are indicated by the numerals 1 to 9, reference may be made to FIGURE 6 wherein the displacement diagram shows pistons 1 to 4 on a suction stroke in communication with the inlet port 70, pistons 6 to 9 on a discharge stroke in communication with the outlet port 60 and piston 5 at bottom center position between the inlet and outlet ports crossing over gap 140. The bleed path formed at the periphery of the valve plate is exaggerated in size in FIGURES 6, 7 and 8 for purposes of illustration. Additional dotted lines from the bleed paths at the periphery of the valve plate indicate the connection of the bleed paths to the inlet side of the device.

The operation of the device so far described with the rotary valve plate in its maximum displacement position is in all respects similar to the operation of conventional devices of this type; that is, as the cylinder barrel rotates, each piston on a suction stroke will during its entire stroke be in communication through its associated cylinder port 32 with the valve plate inlet or suction port 72, while each piston on a discharge stroke will during its entire stroke be in communication through its associated cylinder port 32 with the valve plate outlet or discharge port 60.

Figure 7:
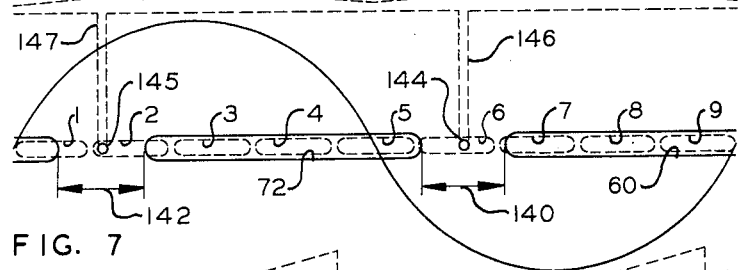
FIGURE 7 is a displacement diagram similar to that of FIGURE 6 but with the valve plate rotated 45° from its maximum displacement position.
Figure 8:
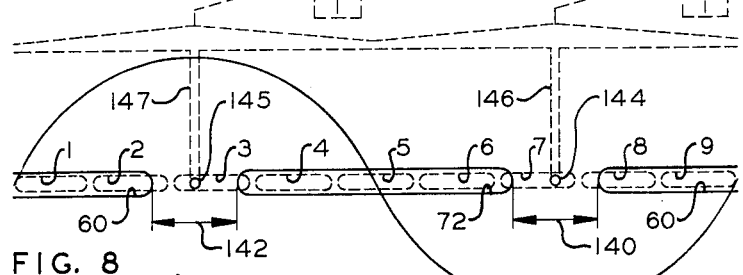
FIGURE 8 is a displacement diagram similar to that illustrated in FIGURES 6 and 7 but with the valve plate rotated 90° from its maximum displacement position to zero displacement position.
Figure 9:
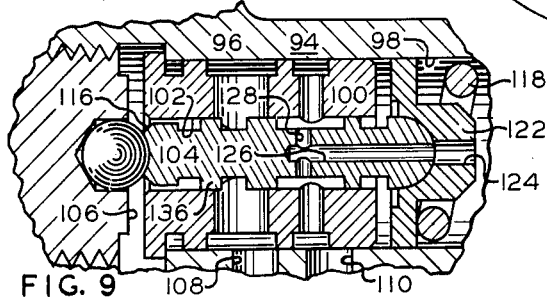
FIGURE 9 is an enlarged partial sectional view of the control valve as illustrated in FIGURE 1.

It should be noted, however, that when the valve plate 34 is rotated clockwise from the maximum displacement position illustrated in FIGURE 4 and in relation to the position of the cylinder barrel numerical stroking piston scheme shown in FIGURE 5 and as further illustrated in the flow displacement diagrams of FIGURES 7 and 8, that the valve plate inlet and outlet ports 72 and 60 will become mistimed or out of phase wth the stroking pistons of the cylinder ports 32 of the cylinder barrel indicated by the numerals 1 to 9. When the valve plate is rotated, each piston 22 for a portion of its suction stroke will be in communication by means of its associated cylinder port 32 with the valve plate outlet or discharge port 60, and for a like portion of its discharge stroke will, through the same associated cylinder port 32, be in communication with the valve plate inlet port 72. The total displacement of the device for each revolution of the cylinder barrel is decreased, therefore, by an amount equal to the cubic in. displacement of each piston for that portion of its stroke, when it is either taking in fluid from the outlet port or discharging into the suction port of the valve plate multiplied by the number of pistons within the cylinder barrel. Reference may be made to the flow displacement diagram of FIGURE 7 with the valve plate rotated 45° from the maximum displacement position, wherein piston 1 intiates a suction stroke while in communication with outlet port 60 and with pistons 2, 3 and 4 on a suction stroke in communication with inlet port 72, while pistons 7 to 9 are on a discharge stroke in communication with the outlet port 60. Piston 6 is crossing over the closed gap 140 while on a discharge stroke, while piston 5 on a changeover from suction to pressure is in communication with the inlet port 72. As the valve plate is continued to be rotated, each piston on a discharge stroke will for a greater portion of such stroke be connected to the valve plate inlet or suction port 72 and will likewise be connected for a greater portion of its suction stroke to the valve plate discharge port 60. When the valve plate 34 has been rotated 90°, those pistons which are on the changeover from a pressure stroke to a suction stroke and on the changeover from a suction stroke to a pressure stroke will be passing the center of the valve plate inlet and outlet ports 72 and 60. Reference may be made to the flow displacement diagram of FIGURE 8 wherein pistons 1 and 2 on a suction stroke are shown in communication with the discharge port 60, while pistons 6 and 7 on a discharge stroke are shown in communication with the inlet port 72, and piston 5 on a changeover from suction to pressure stroke is passing the center of inlet port 72. At this position of the valve plate 34, of the total number of pistons in communication with the valve plate inlet port through their associated cylinder ports, one-half of such pistons will be on a discharge stroke while one-half will be on an intake or suction stroke and likewise for the total number of pistons in communication with the valve plate outlet port. The pump will, at this position of the valve plate, be at zero displacement. Each piston will initiate its suction stroke while in communication with the outlet or discharge port 60 of the valve plate 34 and will complete its suction stroke while in communication with the valve plate inlet port 132. Each piston will initiate its discharge stroke while its associated cylinder port is in communication with the valve plate inlet port 72 and will complete its discharge stroke while in communication with the valve plate outlet port 60.

In the device disclosed the displacement will begin to decrease upon slight rotation of the valve plate 50, the displacement varying approximately as the cosine of the angle of rotation. Thus for every gallon of displacement, after 22½° of rotation of the valve plate from the maximum displacement position, the displacement will be .924 G; at 45°, .707 G; at 60°, .50 G; at 67°, .382 G; and at 90°, 0 G.

The valve plate is provided with bleed passages having openings at their opposite ends respectively in the solid surface gaps of the valve plate and at the periphery of the rotor, the latter of which, in the maximum displacement position of the valve plate, are substantially sealed off by the true arc surface portions of the elliptical chamber in which the valve plate is rotatably supported. When the valve plate is rotated to decrease the displacement of the pumping mechansim, the openings of the bleed passages at the periphery of the valve plate shift into the expanding portions of the bleed paths 140 and 142. Counterwise, when the valve plate is actuated back to the maximum displacement position, the bleed passage openings shift into contracting portions of the bleed paths.

For this purpose the valve plate is provided with two axial passges 144 and 145 respectively having openings intermediate the closed gaps 140 and 142 of the valve plate face 62, and two radial passages 146 and 147 respectively connected to the radial passages 144 and 145 and which open to the periphery of the valve plate adjacent the closed gaps between opposite ends of the valve plate inlet and outlet ports. As each cylinder port crosses over the closed gaps 140 and 142, it respectively comes into communication with the openings of the axial passages 144 and 145 at the valve plate face 62.

In the maximum displacement position of the valve plate, the pistons crossing over the closed surface gaps will be on a changeover from suction to pressure stroke and from pressure to suction stroke so that it is not essential that the bleed path be effective. However, when the valve plate is rotated to decrease the displacement of the device, each piston for a portion of its suction stroke will be passing over the closed gap 140, and each piston for a portion of its discharge stroke will be passing over the closed gap 142. In order to prevent cavitation and high pressure impulses, a bleed path is provided for the pistons on the suction stroke, while crossing over one of the closed gap surfaces, and a bleed path is provided leading from the other closed gap across which pistons pass while on a pressure stroke. This arrangement has the advantage that the valve plate bleed passage openings at the periphery of the valve plate are sealed off by the true arc portions of the elliptical chamber when the bleed path is not essential at maximum displacement position of the valve plate, but such openings are shifted into the bleed path to make the same effective when the phase relation of valve plate porting and piston stroking is changed on rotation of the valve plate. Most important, the size of the bleed path is correlated to valve plate rotation so as to vary in accordance with variation in the valve plate porting and piston stroking phase relationship. That is, with slight valve plate rotation and slight out-of-phase relationship, the bleed path formed is slight and highly restricted. As the valve plate is progressively rotated to increase the out-of phase relationship, the bleed path increases in size or becomes progressively less restricted.

It will thus be seen that the present invention provides a rugged, compact, low-cost fixed angle, rotary axial piston pump having improved means for varying the displacement. The displacement of the device is varied without varying the length of stroke of the pistons by utilizing a pressure operated, rotatable fluid distributing member for changing the phase relationship between valve plate inlet and outlet porting and the striking pistons of the cylinder barrel. It should be noted, however, that the invention provides novel variable displacement means, comprising the pump head and rotatable fluid distributing member mounted therein, which is well suited and adapted for use with presently well-known casing and rotary axial piston pumping structure of the fixed angle type. Unlike former rotary axial piston devices which utilize greatly enlarged casings, relative to casings of fixed displacement devices of the same type to accommodate variable displacement structure for the rotary axial piston pumping mechanism, the present invention makes it possible to utilize the very same casing utilized for fixed displacement units of the same type, thus providing a great saving in size, weight and cost. The invention makes it possible to utilize not only the same casing but also the same rotary pumping mechanism for both fixed displacement and variable displacement units. The present invention, therefore, provides great savings over other types of fixed angle, variable displacement fluid pumps wherein both the pumping mechanism and the casing of variable displacement units are modified as to structure and size from those of fixed displacement devices of the same type. Thus by replacing only the pump head and valve plate of a conventional fixed angle, rotary axial piston pump with the pump head and fluid distributing member of the present invention device, there is provided a compact, rugged, economically manufactured and efficiently operating variable displacement device.

While the form of embodiment of the invention as herein disclosed constitutes a preferred form, it is to be understood that other forms might be adopted, all coming within the scope of the claims which follow.

What is claimed is as follows:

1. A rotary, axial piston type pump or motor device comprising: a rotatable cylinder barrel having a valving surface; pistons in the barrel; camming means for causing reciprocation of said piston in said barrel; an external casing surrounding said cylinder barrel and camming means, said casing terminating in a mounting face lying substantially in the plane of said valving surface and having an axial opening through which said valving surface is exposed; a head member secured to said mounting face; a valve plate rotatably mounted in said head member and having inlet and outlet ports; and fluid pressure operated means located entirely within said head member for rotating said valve plate to vary the effective displacement of said device.

2. A variable displacement fluid energy translating device comprising: a hollow casing having an axial opening at one end: pumping mechanism of the rotary, axial piston type within the casing including a rotary cylinder barrel with axially reciprocating piston, the cylinder barrel having a valving face at the casing opening with cylinder ports opening thereto associated with the pistons; a head for the pump mounted against the said end of the casing and forming a chamber adjacent the casing opening; a valve plate rotatably mounted in the chamber having a valving face with inlet and outlet ports opening thereto in fluid sealing engagement with the cylinder barrel valving face; means forming inlet and outlet passages connected respectively to the valve plate inlet and outlet ports; and fluid pressure operated means located entirely within the pump head for rotating the valve plate to change the phase relation between the valve plate ports and reciprocating pistons for varying the displacement of the pumping mechanism.

3. A variable displacement fluid energy translating device comprising: a hollow casing having an axial opening at one end: pumping mechanism of the rotary, axial piston type within the casing including a rotary cylinder barrel with axially reciprocating piston, the cylinder barrel having a valving face at the casing opening with cylinder ports opening thereto associated with the pistons; a head for the pump mounted against the said end of the casing and forming a chamber adjacent the casing opening; a valve plate rotatably mounted in the chamber having a valving face with inlet and outlet ports opening thereto in fluid sealing engagement with the cylinder barrel valving face; means forming inlet and outlet passages continuously connected repectively to the valve plate inlet and outlet ports; means resiliently positioning the valve plate establishing a phase relation between the valve plate porting and reciprocating pistons providing maximum displacement of the pumping mechanism; and fluid pressure operated means located entirely within the head for rotating the valve plate from said position to change the phase relation between said valve plate ports and reciprocating pistons to vary the effect displacement of the pumping mechanism.

4. A variable displacement fluid energy translating device comprising: pumping mechanism including a rotary cylinder barrel having a plurality of pistons reciprocating within axial cylinders opening to a valving face; a casing surrounding the pumping mechanism having a mounting face at one end with an axial opening through which said valving face is exposed; a head member secured to said mounting face; a fluid distributing member rotatably mounted in the head member and having a valving face with inlet and outlet ports opening thereto in fluid sealing engagement with the cylinder barrel valving face; an inlet passage and an outlet passage in said head member connected respectively to the valve plate inlet and outlet ports; and means operated by fluid pressure and located entirely within said head member and connected to said outlet passage for rotating said fluid distributing member for varying the phase relation between the said inlet and outlet ports and the reciprocating pistons for varying the displacement of the pumping mechanism.

5. A variable displacement fluid energy translating device comprising: pumping mechanism including a rotary cylinder barrel having a plurality of pistons reciprocating within axial cylinders opening to a valving face; a casing surrounding the pumping mechanism having a mounting face at one end with an axial opening through which said valving face is exposed; a head member secured to said mounting face; a fluid distributing member rotatably mounted in the head member and having a valving face with inlet and outlet ports opening thereto in fluid sealing engagement with the cylinder barrel valving face; means resiliently positioning the fluid distributing member to establish a phase relation between the said inlet and outlet ports and the reciprocating pistons providing maximum displacement of the pumping mechanism; an inlet passage and an outlet passage respectively connected to the inlet and outlet ports; and pressure responsive means within the head member connected to the outlet passage for rotating said fluid distributing member to change the said phase relation between said ports and reciprocating pistons for varying the displacement of the pumping mechanism.

References Cited by the Examiner
UNITED STATES PATENTS

| | | | |
|---|---|---|---|
| 1,158,554 | 11/1915 | Pratt | 121—62 |
| 1,486,835 | 3/1924 | Hill | 103—120 |
| 2,364,301 | 12/1944 | MacNeil | 103—162 |
| 2,808,812 | 10/1957 | Shaw | 121—62 |
| 2,956,512 | 10/1960 | Brundage | 103—161 |

LAURENCE V. EFNER, *Primary Examiner.*